US010330153B2

(12) United States Patent
Rabhi

(10) Patent No.: US 10,330,153 B2
(45) Date of Patent: Jun. 25, 2019

(54) SYNCHRONIZED ROLLER WITH FREE WHEELS

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 15/860,147

(22) Filed: Jan. 2, 2018

(65) Prior Publication Data
US 2018/0187721 A1 Jul. 5, 2018

Related U.S. Application Data

(60) Provisional application No. 62/441,717, filed on Jan. 3, 2017.

(51) Int. Cl.
| *F16C 33/34* | (2006.01) |
| *F16C 33/30* | (2006.01) |
| *F16C 33/49* | (2006.01) |
| *F16C 33/58* | (2006.01) |
| *F16C 33/36* | (2006.01) |
| *F04B 1/00* | (2006.01) |

(52) U.S. Cl.
CPC .............. *F16C 33/306* (2013.01); *F04B 1/00* (2013.01); *F16C 33/36* (2013.01); *F16C 33/491* (2013.01); *F16C 33/585* (2013.01)

(58) Field of Classification Search
CPC .................................................. F16C 33/306
See application file for complete search history.

(56) References Cited

U.S. PATENT DOCUMENTS

| 473,974 A * | 5/1892 | Stafford et al. ......... F16C 19/26 384/550 |
| 499,847 A | 6/1893 | Nagel |
| 715,171 A * | 12/1902 | Stilson .................... F16C 19/36 384/550 |
| 1,092,174 A * | 4/1914 | Schiesl ................... F16C 19/26 384/550 |
| 1,222,534 A * | 4/1917 | Cormier ................ F16C 33/306 384/550 |
| 3,938,865 A * | 2/1976 | Rouverol ................ F16C 19/22 384/550 |
| 3,998,506 A * | 12/1976 | Traut ...................... F16C 19/26 384/550 |
| 6,601,551 B1 | 8/2003 | Rabhi |
| 8,783,958 B2 * | 7/2014 | Kawashima ............ F16C 25/08 384/451 |
| 2004/0168669 A1 | 9/2004 | Rabhi |
| 2014/0216023 A1 | 8/2014 | Rabhi |

FOREIGN PATENT DOCUMENTS

| FR | 2 786 530 A1 | 6/2000 |
| FR | 2 827 634 A1 | 1/2003 |
| FR | 3 001 774 A1 | 8/2014 |
| GB | 608 153 A | 2/1946 |

* cited by examiner

*Primary Examiner* — Thomas R Hannon
(74) *Attorney, Agent, or Firm* — Young & Thompson

(57) ABSTRACT

The synchronized roller with freewheels includes a central body which exposes an outer cylindrical rolling surface provided to roll between two rolling tracks lined with a synchronizing unit, each end of the body presenting a smooth axis about which a synchronizing pinion is freely rotatable, the axis having a pinion axial stop unit which prevents the pinion from emerging from the pinion, while a roller axial guide bears on the central body and on the rolling tracks to keep the outer cylindrical rolling surface approximately centered on the tracks.

15 Claims, 13 Drawing Sheets

SYNCHRONIZED ROLLER WITH FREE WHEELS

BACKGROUND OF THE INVENTION

Field of the Invention

The present invention relates to a synchronized roller with freewheels cooperating mainly either with four racks and two flat rolling tracks, or with two outer rings which border an inner annular rolling track, and two inner rings which border an outer annular running track whose diameter is larger than that of the inner annular track.

Description of the Related Art

Various applications are known in which synchronized rollers are used. For example, the tangential arm antifriction roller as described in the patent relating to a fixed or variable displacement hydraulic motor/pump published under No. FR 3 001 774 and belonging to the applicant, is in itself a synchronized roller.

In the same said Patent No. FR 3 001 774, it is noted that the central rotor bearing of the hydraulic motor/pump may comprise central rotor bearing rollers while the peripheral rotor bearing of said motor/pump may comprise peripheral rotor bearing rollers. Said rollers are also, and by nature, synchronized rollers.

According to this latter application, it is noted that said rollers can roll simultaneously on an inner bearing track which forms an inner annular rolling track, and on an outer bearing track which forms an outer annular rolling track.

The advantage of this configuration using synchronized rollers is that said rollers are constantly equidistant from each other by means of roller gears which they comprise at each of their two ends, each gear cooperating on the one hand, with an inner crown, and on the other hand, with an outer crown.

The rolling bearings that result from said configuration do not require a ball or roller cage as do the ball or roller bearings ordinarily used in many mechanical devices. This is advantageous in that said cage is both less precise and less durable than synchronized rollers, and in that it regularly collides with the balls or the rollers which it encloses, which generates friction losses where it makes contact with said beads or said rollers.

In addition, it is noted in Patent No. FR 3 001 774 that in meshing with the inner and outer crowns with which they cooperate, the roller gears impose on the bearing rollers a trajectory truly perpendicular to the axis of rotation of the central rotor with respect to the central rotor bearing, and truly perpendicular to the axis of the peripheral rotor with respect to the peripheral rotor bearing.

Among the advantages claimed for said rollers in Patent No. FR 3 001 774, it is noted that these can have a large diameter so that, even if they are subjected to a very high load, the Hertzian contact stress they exert on the inner track and on the outer track with which they cooperate can remain within the limits of mechanical strength of materials commonly used by those skilled in the art to achieve rolling bearings.

In addition, this particular design gives said rollers a maximum rotational speed which remains acceptable despite the large diameter of the rotor bearings comprised by the motor/pump.

Thus, the synchronized roller bearings as described in Patent No. FR 3 001 774 can simultaneously have a large diameter, withstand heavy loads and high radial forces, and rotate at high speed, while the rolling bearings usually implemented by those skilled in the art have little or no access to this combination of functional conditions.

In addition, it is easy to deduce from this particular configuration that said bearings can offer a high efficiency thanks, in particular, to the absence of cage as previously mentioned, but also thanks to the lack of necessity to generate a low friction between the rollers and the inner and outer tracks with which they cooperate to force said rollers to follow a trajectory as perpendicular as possible to the axis of rotation of the bearing of which they are one of the components.

Indeed, according to the synchronized roller bearings as described in Patent No. FR 3 001 774, the orientation of said rollers is ensured by the gear system formed by the roller gears and the inner and outer crowns with which they cooperate.

Among the other applications in which synchronized rollers are used, there is the mechanical transmission device for variable displacement motor object of Patent No. FR 2,786,530 belonging to the applicant.

Said patent discloses a rolling guide device consisting of two synchronized rollers which provide frictionless guidance to two half-racks on an engine block.

It should be noted that according to a variant proposed by said Patent No. FR 2 786 530, the synchronized rollers may consist of a hollow cylindrical sleeve longitudinally traversed by an axis at both ends of which toothed wheels made integral in rotation with said axis by splines are fixed. It should be noted that in this case, a free space is left between said sleeve and said axis, said space receiving a spring connection.

Patent No. FR 2 827 634, also belonging to the applicant, relates to improvements made to mechanical transmission devices for a variable displacement motor. Said patent also provides a synchronized roller consisting of a cylindrical body having gears at each of its ends, a guide groove being provided between the gears.

This particular configuration is also found in U.S. Pat. No. 2,956,452, also belonging to the applicant, and relates to a double-acting piston compressor guided by a roller and driven by a toothed wheel and racks. In said U.S. Pat. No. 2,956,452, it should be noted that the double-acting piston compressor comprises a transmission member which has a rolling surface on which a guide roller, whose ends have small toothed wheels, can roll.

Like the synchronized roller described in Patent FR 2 827 634, the guide roller provided for in U.S. Pat. No. 2,956,452 cooperates with rolling surfaces and racks.

The synchronized rollers as described in Patents FR 3 001 774, FR 2 786 530, FR 2 827 634 and 2 956 452 all have the particularity of having a cylindrical rolling surface which constitutes the body of said rollers, the diameter of said surface being close to, or even identical to, that of the pitch circle of the toothed wheels that said rollers comprise at their ends.

In any event, the devices having no cylindrical rolling surface such as that proposed, for example, in U.S. Pat. No. 499,847 of Jun. 20, 1893 relating to a roller for a wagon, are irrelevant to the subject treated in the present patent application. This remark also applies to Patent No. GB 608,153 of Feb. 15, 1946 relating to improvements for crank mechanism.

In addition to having a rolling cylindrical surface ensuring minimal friction displacement, the interest of the synchronized rollers, as just described, is that they always maintain the same speed of movement relative to the racks or crowns with which they cooperate or, according to the mechanism in question, that they always maintain the same position relative to said racks or said crowns.

It should be noted that the synchronized rollers are mainly retained for particularly loaded applications in which said rollers are subjected to a high radial compressive force. In most cases, this radial compression excludes any recourse to a hollow cylindrical sleeve as proposed in Patent No. FR 2 786 530, said sleeve being insufficiently rigid and resistant to crushing. In addition, said compression poses various implementation problems which are directly addressed by the synchronized freewheel roller according to the present invention.

Indeed, said radial compression deforms the cylindrical rolling surface of the synchronized roller, which becomes no longer exactly circular in that it has two flats. This radial compression of the rolling cylindrical surface induces to a certain extent a tangential compression of the material constituting said surface, which leads to a substantial change in the circumference of the synchronized roller. As a result, said tangential compression substantially alters the speed of rotation of the synchronized roller at the same linear speed of displacement of said roller.

To illustrate the consequences of the geometric alteration that has just been mentioned of said rolling cylindrical surface, let us take, for example, a synchronized roller which is placed between a fixed flat rolling surface and a moving flat rolling surface, each said surface being lined with racks with which the gears, each being integral with an end of said roller, cooperate.

When the moving flat rolling surface is displaced, the synchronized roller moves half as fast as said surface with respect to the fixed flat rolling surface, which occurs regardless of the geometric alteration of the rolling cylindrical surface resulting from the crushing under load of said roller.

However, concomitantly with the crushing of said synchronized roller, the angular displacement of the latter varies very substantially relative to its linear displacement.

The problem is that the angular displacement of the gears, which are mounted at each end of said roller, is determined by the teeth of said gears and by the teeth of the racks with which they cooperate. The angular displacement of said gears is therefore invariable, while the angular displacement of the roller varies as a function of the radial load to which it is subjected.

Under heavy load, said roller tends to impose to the gears fixed at each of its ends a rotational speed different from that which the racks impose to said gears. As said roller is subjected to a high radial load, it adheres strongly to its running surfaces and resists the angular position correction that its gears tend to produce.

It follows that the teeth of the gears and racks are subjected to an abnormal load which can lead to premature wear or even breakage of said teeth. In addition, said abnormal load produces friction, which is detrimental to the overall energy balance of the mechanism or apparatus in which the synchronized roll is implemented.

It will be noted that the difference between the angular speed of the roller and that of the gears can also come, on the one hand, from the manufacturing precision of the rolling cylindrical surface of the synchronized roller and, on the other hand, from the manufacturing precision of the gear system that constitute the pinions attached to each end of said roller and the racks with which they cooperate. Indeed, since said precision is not infinite, the diameter of the rolling cylindrical surface does not coincide exactly with the diameter of the pitch circle of said gear system.

Also, in the case where, simultaneously, the synchronized roller is subjected to a high radial load while the teeth constituting said gear system are already in contact with each other and while the movement of said roller tends to bring said teeth closer to each other, then, an abnormal load occurs at the level of said teeth which, as before, can lead to premature wear or even breakage.

As before, said high radial load produces frictional energy losses that are detrimental to the overall energy balance of the mechanism or apparatus in which the synchronized roller is implemented.

It will be noted in Patent FR 2 827 634 that the synchronized roller has in its center a guide groove which cooperates with a vertical rib that is comprised in a rolling track integral with the engine block of the variable displacement motor. Said groove and said rib provide lateral guidance to the synchronized roll.

The disadvantage of this configuration is that it presents a certain complexity of implementation, in particular because the rolling track integral with the engine block is no longer a single flat and uniform surface easy to rectify.

In addition, the division into two longitudinal portions of the rolling cylindrical surface of the synchronized roller doubles the number of edges of said surface. This involves making two convex profiles on said cylindrical surfaces—one per said portion—to limit the stress applied to the constituent material of the cylindrical body of the synchronized roller at said edges, said stress being known to those skilled in the art under the name of 'edge effect'.

It follows from this need for double convex profile that the two said longitudinal portions are subjected to a maximum Hertzian contact stress greater than that to which a single rolling cylindrical surface would be subjected for not being divided into two longitudinal portions.

It will also be noted in Patent FR 2 827 634 that the synchronized roller is made of a one-piece assembly machined in a single piece of material while said roller cooperates with only three small racks and not four.

I should be noted that two of said small racks are integral with the engine block while the integral transmission member of the piston of the variable displacement motor has only one.

This strategy allows, on the one hand, maintaining the orientation of the synchronized roller with respect to the engine block while ensuring the proper synchronizing of the vertical displacement of said roller with respect to that of said piston and, on the other hand, allows the organ transmission to pivot without damaging said roller. While this strategy does work, its disadvantage is that it makes the production of the synchronized roller more complex and expensive.

Indeed, given that the rolling cylindrical surface of said roller has to coincide as much as possible with the diameter of the pitch circle of the gear system formed by the gears of said roller with the racks with which they cooperate, the manufacture of said gears becomes difficult in that it there is very little tool clearance to make said gears.

Also, producing such a monobloc synchronized roller requires the use of expensive manufacturing methods such as precision electrochemical machining.

In addition, the surface treatments and heat treatments to be applied to the rolling cylindrical surface which is subjected to high Hertzian contact stresses are not very compatible with the teeth of the gears which—being of small size—would become too fragile.

Consequently, it is necessary either to leave high thicknesses of material on said pinions to remove the hard layer, for example case hardened or nitrided by machining, which greatly increases the manufacturing cost price of the synchronized roller, or to mask the areas where these gears must be made during cementation of the synchronized roller, which also leads to a high manufacturing cost price of said roller. However, it should be noted that the production cost per unit of a monobloc synchronized roller, as described above, remains acceptable on a variable displacement motor as described in Patent No. FR 2 827 634 because each cylinder of said engine has only one said roller.

On the other hand, the same unit cost would be unacceptable, for example in the case of producing the synchronized rollers of the central rotor bearings and the peripheral rotor bearings of the hydraulic motor-pump with fixed or variable displacement, as described in Patent No. FR 3. 001 774, given the large number of said rollers included in said motor-pump.

SUMMARY OF THE INVENTION

It is therefore to solve the functional and cost of manufacturing problems that have just been exposed that, according to a particular embodiment, the synchronized roller with freewheels:

The objectives of the synchronized roller with freewheels are therefore to solve, according to a particular embodiment, the functional and manufacturing cost problems that have just been exposed by:
- allowing the speed of rotation of the cylindrical rolling surface comprised in the central body of said roller to be substantially different from that of the gears provided at the ends of said roller, while not subjecting to an abnormally high load the teeth of said gears and racks with which they cooperate, especially when the synchronized roller is itself subjected to a high radial load;
- providing a cylindrical rolling surface of the central body of said roller whose diameter is greater or smaller than that of the pitch circle of the gears provided at the ends of said roller without affecting the proper operation of said roller, this potentially allowing to simplify and reduce the manufacturing cost of said roller and/or rolling tracks and racks or crowns with which it cooperates;
- allowing—when said roller is subjected to a high radial load—a slight difference between the forward speed of the rolling cylindrical surface of the central body of said roller and the forward speed of the gears provided at the ends of said roller without subjecting to an abnormally high load the teeth of said gears and racks or crowns with which they cooperate;
- providing simple axial guide means, inexpensive to manufacture, and which do not require dividing the cylindrical rolling surface of said roller in several portions to make room for any guide groove whatsoever;
- allowing dedicated and independent parts to provide the rolling, meshing and axial guiding functions, which makes it possible to very significantly reduce the manufacturing cost of said roller by using low cost and productive production processes for each said part.

It should be understood that the synchronized roller with freewheels according to the invention is mainly intended for large bearings, rotating at high speed, and subjected to heavy loads as presented in the patent relating to the hydraulic motor-pump with fixed or variable displacement published under No. FR 3 001 774 and belonging to the applicant.

However, the synchronous roller with freewheels according to the invention can also be applied without restriction to any other bearing or mechanism to which it would bring a functional or energetic advantage, or of any nature whatsoever, said bearing or mechanism being implemented in any application whatsoever.

By way of non-limiting example, the synchronized roller with freewheels according to the invention can be applied to the variable displacement motor, in particular the object of the Patents FR 2 786 530 or FR 2 827 634, which belong to the applicant, by replacing the sleeve or monobloc rollers as described and disclosed in said patents.

By way of another nonlimiting example, the synchronized roller with freewheels according to the invention may advantageously constitute the tangential arm antifriction roller as described in the patent relating to the hydraulic motor-pump with fixed or variable displacement published under the No FR 3 001 774 and belonging to the applicant.

The other features of the present invention were described in the description and in the dependent claims, directly or indirectly dependent on the main claim.

The synchronized freewheel roller according to the present invention comprises a central body which exposes a rolling outer cylindrical surface provided between two rolling tracks on which it rolls simultaneously when said tracks move relative to each other, each said track being integrally bordered by synchronizing means which form a gear system with a synchronizing pinion at each end of the central body, said roller comprising:
- a smooth axis with a smaller diameter than that of the cylindrical rolling surface, arranged at each end of the central body, and around which the synchronizing pinion can rotate freely;
- axial pinion stop means integral with the smooth axis which bear, on the one hand, directly or indirectly on said axis and, on the other hand, directly or indirectly on the synchronizing pinion, to prevent said pinion from coming out of said axis;
- roller axial guide means which bear, on the one hand, directly or indirectly on the central body and, on the other hand, directly or indirectly on at least one of the rolling tracks with which the cylindrical rolling surface cooperates, in order to keep the latter approximately centered on said tracks.

The synchronized roller with freewheels according to the present invention comprises axial pinion stop means which consist of a spring axial stop ring housed in a spring ring groove arranged on the smooth axis.

The synchronized roller with freewheels according to the present invention comprises roller axial guide means which consist of a rigid axial guide washer which is axially and directly or indirectly interposed between the synchronizing pinion and an axial bearing surface which exposes the central body between the smooth axis and the outer cylindrical rolling surface, said rigid washer being able to bear on an axial guide track axially exposed by at least one of the rolling tracks.

The synchronized roller with freewheels according to the present invention comprises an axial guide spring washer which is interposed between the rigid axial guide washer and the synchronizing pinion, said spring washer tending to press, on the one hand, the rigid axial guide washer against the axial bearing surface with which it cooperates and, on the other hand, the synchronizing pinion against the pinion axial stop means with which it cooperates.

The synchronized roller with freewheels according to the present invention comprises an axial guide spring washer which is interposed between the synchronizing pinion and the pinion axial stop means, said spring washer tending to press the synchronizing pinion against the rigid washer of the pinion axial guide so that the latter is in turn pressed against the axial bearing face with which it cooperates.

The synchronized roller with freewheels according to the present invention comprises an axial guide spring washer which comprises at its center centering claws snapped into a claw groove arranged on the smooth axis, said groove constituting the axial pinion stop means.

The synchronized roller with freewheels according to the present invention comprises spring radial centering means which are interposed radially between the smooth axis and the synchronizing pinion, said means tending to always recenter said pinion on said axis.

The synchronized roller with freewheels according to the present invention comprises spring radial centering means which consist of at least three spring radial centering tabs which, on the one hand, emerge radially from the inner surface of a central recess included in the synchronizing pinion and, on the other hand, can touch the smooth axis.

The synchronized roller with freewheels according to the present invention comprises spring radial centering means which consist of at least one tab washer which has in its center a rotating sleeve which can rotate about the smooth axis, and whose outer cylindrical face is bristled with at least three spring radial centering tabs that can press on the inner surface of a central recess included in the synchronizing pinion.

The synchronized roller with freewheels according to the present invention comprises spring radial centering means which consist of at least three deformable rings which, on the one hand, are placed in a ring housing arranged on the inner surface of a central recess included in the synchronizing pinion and, on the other hand, can touch the smooth axis.

The synchronized roller with freewheels according to the present invention comprises spring radial centering means which consist of at least one spring washer with radial corrugations housed between, on the one hand, the inner cylindrical face of a central recess included in the synchronizing pinion and, on the other hand, the smooth axis.

The synchronized roller with freewheels according to the present invention comprises spring radial centering means which consist of at least one compressible ring made of flexible material, said ring being radially interposed between, on the one hand, the inner surface of a central recess included in the synchronizing pinion and, on the other hand, a flexible ring support disk that can rotate around the smooth axis.

The synchronized roller with freewheels according to the present invention comprises a synchronizing pinion which has spring radial centering means which tend to always recenter said pinion on the smooth axis and which consist of at least one spring radial centering tab whose first end is integral with a pinion rim located at the periphery of the synchronizing pinion and whose second end is integral with a pinion hub located in the center of the synchronizing pinion, said hub being articulated around the smooth axis.

The synchronized roller with freewheels according to the present invention comprises a synchronizing pinion which has spring radial centering means which tend to always recenter said pinion on the smooth axis and which consist of a thin web forming at least one web cone, the first end of said web being integral with a pinion rim located at the periphery of the synchronizing pinion while the second end of said web is integral with a pinion hub located in the center of the synchronizing pinion, said hub being articulated around the smooth axis.

The synchronized roller with freewheels according to the present invention comprises in at least one of the ends of the central body an anti-edge effect recess which is located between the smooth axis and the outer cylindrical rolling surface.

BRIEF DESCRIPTION OF THE DRAWINGS

The following description, with reference to the accompanying drawings and given by way of non-limiting examples, will provide a better understanding of the invention, the characteristics it presents, and the advantages that it is likely to provide.

DESCRIPTION OF THE INVENTION

FIGS. 1 to 19 show the synchronized roller with freewheels 1, various details of its components, its variants, and its accessories.

Figure 1:
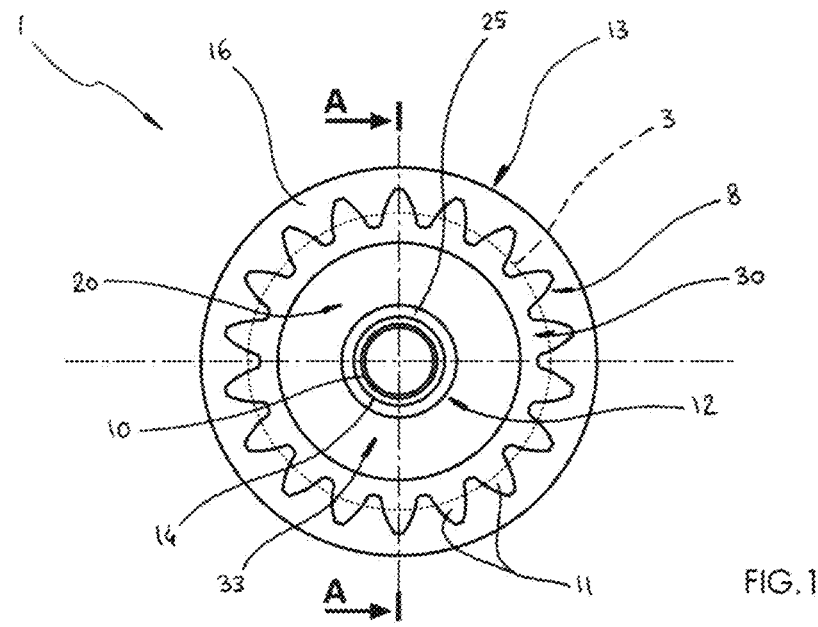
FIGS. 1 and 2 are respectively a side view and a schematic sectional view of the synchronized roller with freewheels according to the invention in a variant according to which the synchronizing pinion has spring radial centering means consisting of a thin web forming two web cones while a rigid axial guide washer constitutes axial roller guide means, said rigid washer being kept pressed against the axial bearing face with which it cooperates by an spring guide ring axially interposed between said rigid washer and the synchronizing pinion.
Figure 2:
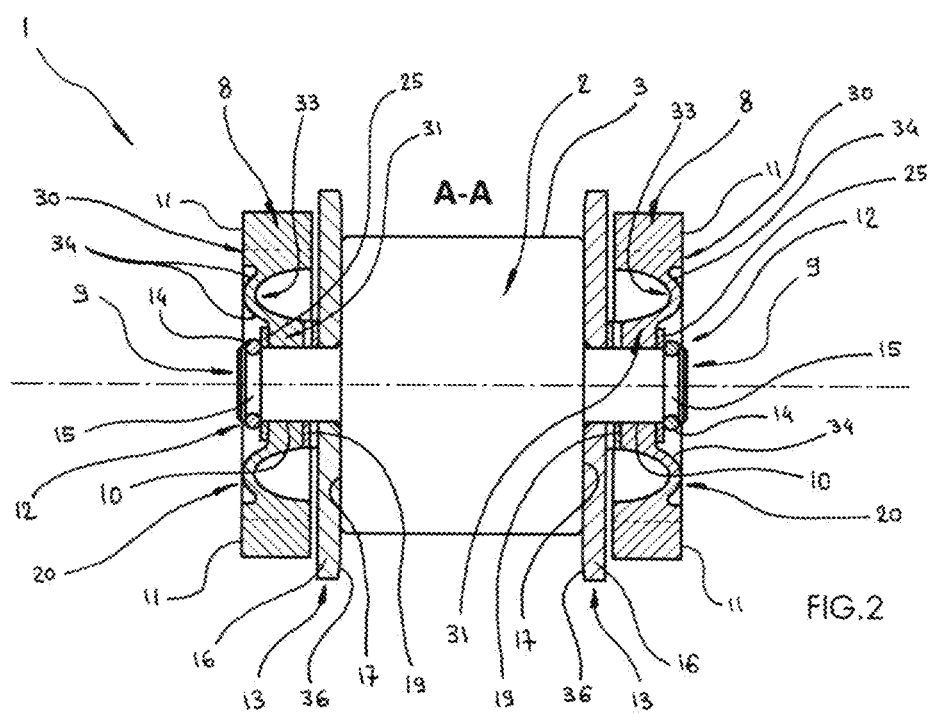

As shown in particular in FIG. 2, the synchronized roller with freewheels 1 comprises a central body 2 which exposes an outer rolling cylindrical surface 3. As can be seen in FIGS. 7 to 12, said surface 3 is intended to be interposed between two rolling tracks 4 on which it rolls simultaneously when said tracks 4 move relative to each other.

Figure 5:
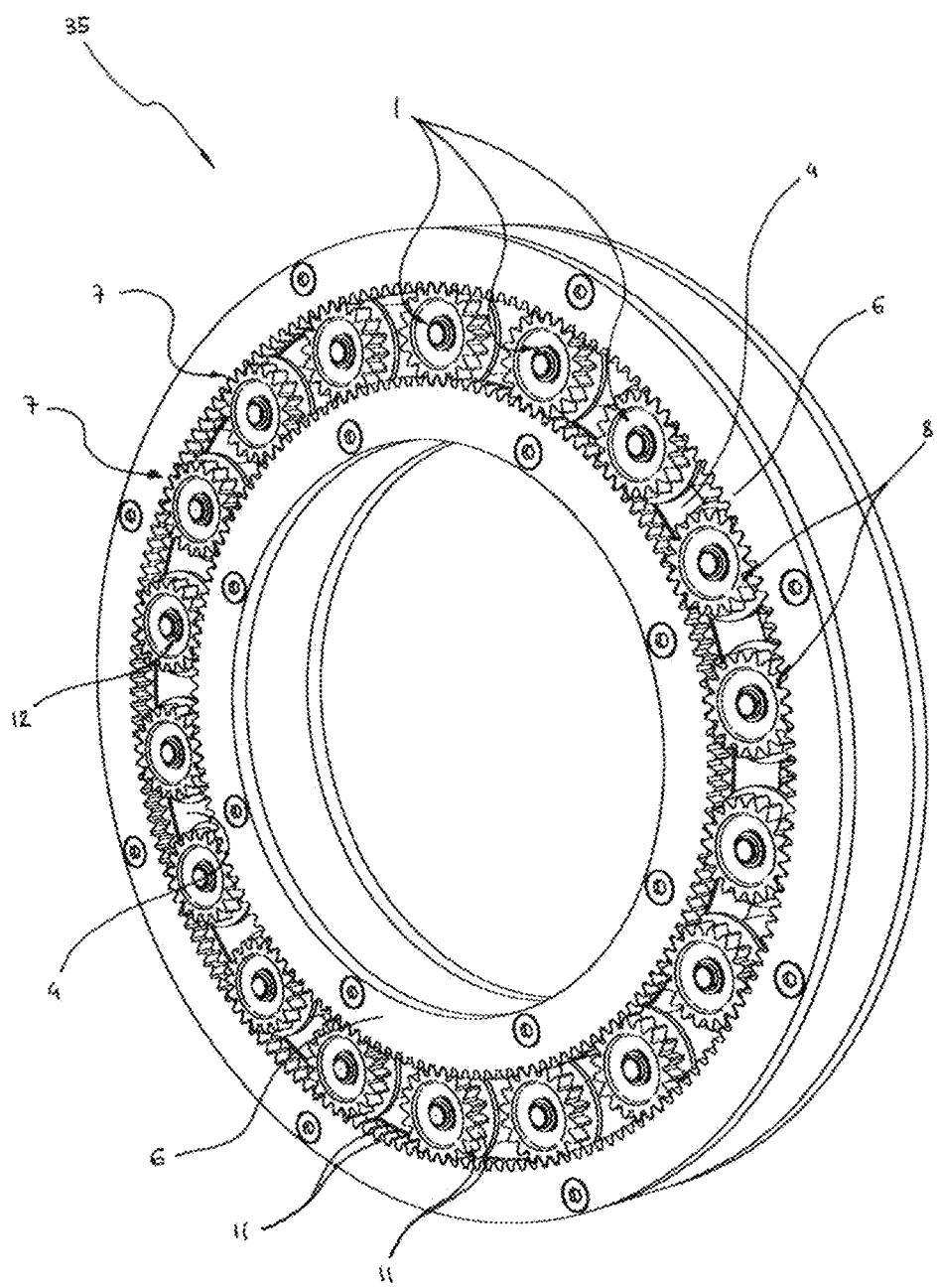
FIG. 5 is a three-dimensional view of a synchronized roller bearing implementing the synchronized roller with freewheels according to the invention and according to its variant shown in FIGS. 1 and 2.
Figure 6:
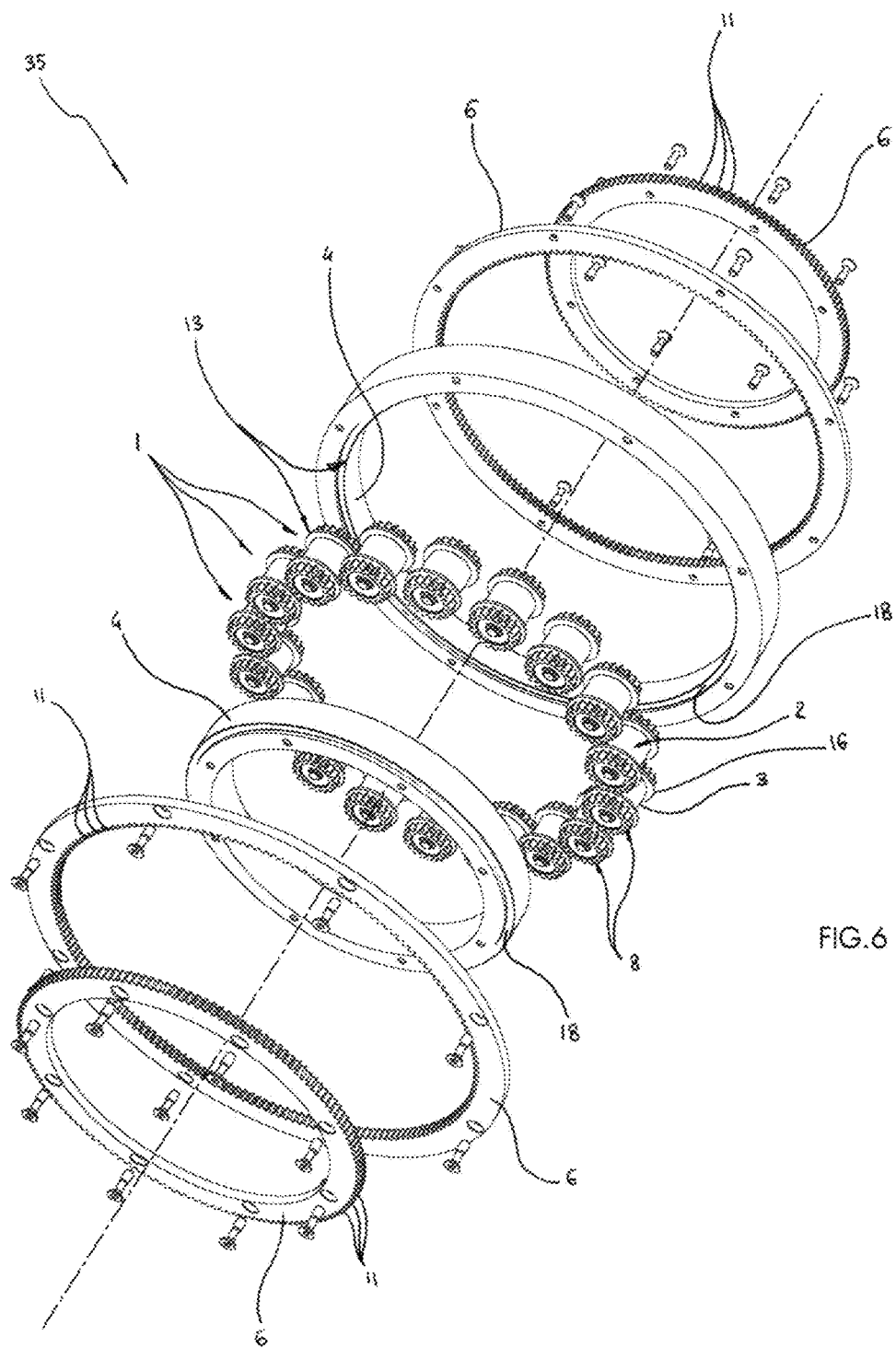
FIG. 6 is an exploded three-dimensional view of the synchronized roller bearing shown in FIG. 5, which implements the synchronized roller with freewheels according to the invention and according to its variant shown in FIGS. 1 and 2.

In FIGS. 7 to 12—and also in FIGS. 5 and 6, showing the synchronized roller with freewheels 1 according to the invention implemented in a synchronized roller bearing 35—it should be noted that each rolling track 4 is integrally lined with synchronizing means consisting of synchronizing racks or synchronizing rings 6 which form a gear system 7 with a synchronizing pinion 8 included at each end 9 of the central body 2.

In FIGS. 1 to 19, it should be noted that the synchronized roller with freewheels 1 according to the invention differs from the prior art in that it comprises a smooth axis 10 of smaller diameter than that of the cylindrical rolling surface 3, arranged at each end 9 of the central body 2, and around which the synchronizing pinion 8 can rotate freely so that if the rolling tracks 4 tend to impose on the outer cylindrical rolling surface 3 a rotational speed substantially different from that which the synchronizing racks or synchronizing rings 6 impose on the synchronizing pinion 8, the teeth 11 included in the gear system 7 are not subjected to an excessive load.

In addition, it will be noted—particularly in FIGS. 1 to 14—that axial pinion stop means 12, integral with the smooth axis 10, bear, on the one hand, directly or indirectly on said axis 10 and, on the other hand, directly or indirectly on the synchronizing pinion 8, to prevent said pinion 8 from coming out of said axis 10.

Finally, it should be noted that the synchronized roller with freewheels 1 according to the invention comprises roller axial guide means 13 which bear, on the one hand, directly or indirectly on the central body 2, and, on the other hand, directly or indirectly at least on one of the rolling tracks 4 with which the rolling cylindrical surface 3 cooperates, in order to keep the latter approximately centered on said tracks 4. This is seen particularly clearly in FIGS. 11 and 12.

FIGS. 1 to 4 allow to observe that the synchronized roller with freewheels 1 according to the invention may comprise pinion axial stop means 12 which consist of a spring axial stop ring 14 housed in a spring ring groove 15 arranged on the smooth axis 10, an axial stop washer 25 being able in this case to be axially interposed between said ring 14 and the synchronizing pinion 8.

In FIGS. 1 to 4 and 7 to 19, it should be noted that the roller axial guide means 13 may consist of a rigid axial guide washer 16 which is axially and directly or indirectly interposed between the synchronizing pinion 8 and an axial bearing face 17 exposed by the central body 2 between the smooth axis 10 and the outer cylindrical rolling surface 3. In this case, said rigid washer 16 can bear on an axial guide track 18 that is axially exposed by at least one of the rolling tracks 4.

It will be noted that the rigid axial guide washer 16 and/or the axial guide track 18 can expose—at the level of the contact zone between said washer 16 and said track 18—a rake edge 36 which prevents the constituent material of said washer 16 from cutting the constituent material of said track 18, or vice versa.

It may be specified here that—as illustrated in FIGS. 1, 4, 11 and 12—a spring axial guide washer 19 may be interposed between the rigid axial guide washer 16 and the synchronizing pinion 8, said spring washer 19 tending to press, on the one hand, the rigid axial guide washer 16 against the axial bearing face 17 with which it cooperates and, on the other hand, the synchronizing pinion 8 against the axial pinion stop means 12 with which it cooperates.

Figure 13:
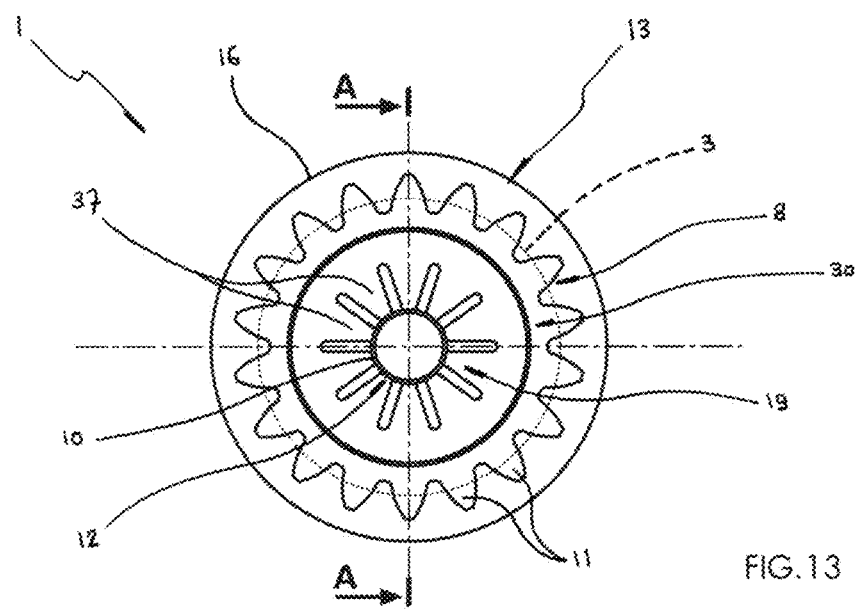
FIGS. 13 and 14 are respectively a side view and a schematic sectional view of the synchronized roller with freewheels according to the invention, in a variant according to which the synchronizing pinion has spring radial centering means consisting of a compressible ring made of flexible material, while a spring axial guide washer is interposed between the synchronizing pinion and the pinion axial stop means, said washer having at its center centering claws snapped into a claw groove arranged on the smooth axis.
Figure 14:
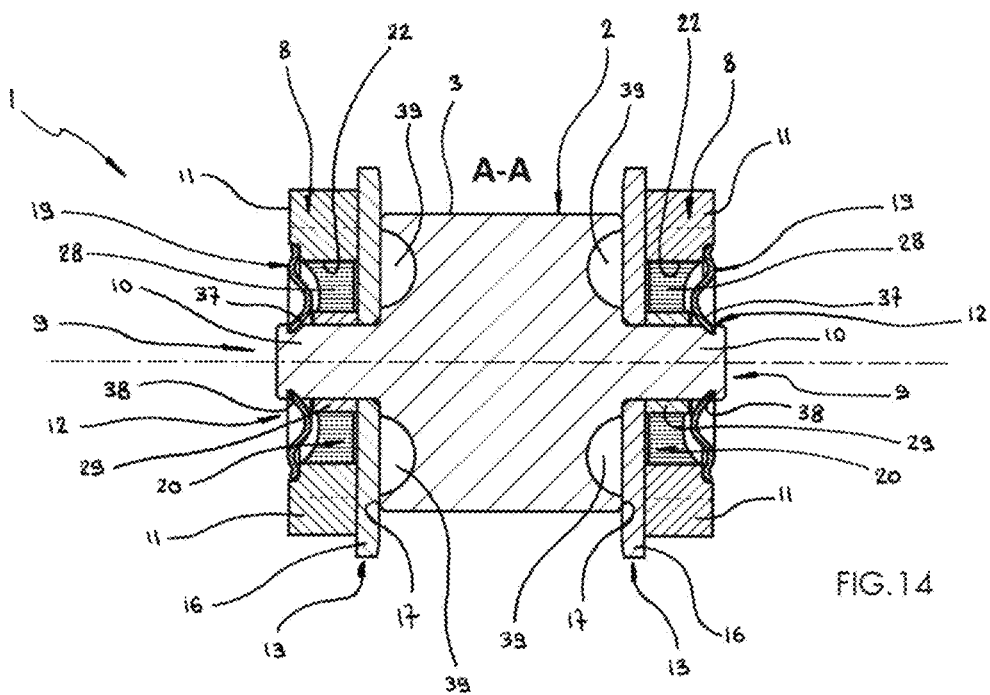

As an alternative shown in FIGS. 13 and 14, a spring axial guide washer 19 can be interposed between the synchronizing pinion 8 and the axial pinion stop means 12, said spring washer 19 tending to press the synchronizing pinion 8 against the rigid axial guide washer 16 so that the latter is in turn pressed against the axial bearing face 17 with which it cooperates.

It will be noted that according to this particular configuration of the synchronized roller with freewheels 1 according to the invention, said spring washer 19 can be substituted for an axial stop washer 25 axially interposed between a spring axial stop ring 14 housed in a spring ring groove 15 arranged on the smooth axis 10—said ring 14 constituting in this case the axial pinion stop means 12—and the synchronizing pinion 8. Still according to the particular configuration shown in FIGS. 13 and 14, it will be noted that said spring axial guide washer 19 may comprise at its center centering claws 37 snapped into a claw groove 38 provided on the smooth axis 10, said groove 38 then constituting the axial pinion stop means 12.

It will be noted in FIGS. 14 to 17 that spring radial centering means 20 can be inserted radially between the smooth axis 10 and the synchronizing pinion 8, said means 20 tending to always recenter said pinion 8 on said axis 10, in particular after a radial force applied on said pinion 8 has offset said pinion 8 with respect to said axis 10.

It is noted that according to this particular configuration of the synchronized roller with freewheels 1 according to the invention, if for example the rolling outer cylindrical surface 3 is subjected to a high radial load and if the effective forward speed of said surface 3 relative to the rolling tracks 4 with which it cooperates is substantially different from that of the synchronizing pinion 8 with respect to said tracks 4, the spring radial centering means 20 allow a slight offset of said pinion 8 with respect to the smooth axis 10 around which it can rotate, said offset notably making it possible to avoid that the difference in speed which has just been evoked results in an excessive load of the teeth 11 that the gear system 7 comprises.

Figure 15:
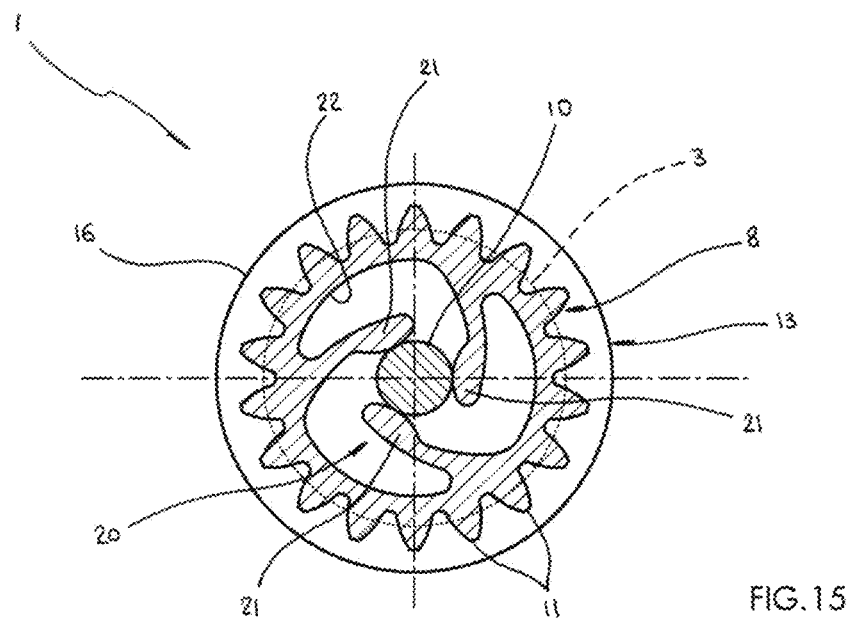
FIG. 15 is a schematic sectional view of the synchronizing pinion and the smooth axis of the synchronized roller with freewheels according to the invention, in a variant according to which spring radial centering means are interposed radially between said axis and said pinion which take the form of three radial centering tabs which emerge radially from the inner surface of a central recess included in said pinion, said tabs being able to touch said axis.

According to the particular configuration of the synchronized roller with freewheels 1 according to the invention 7 which has just been described, it can be seen in FIG. 15 that the spring radial centering means 20 may consist of at least three spring radial centering tabs 21 which, on the one hand, emerge radially from the inner surface of a central recess 22 included in the synchronizing pinion 8 and, on the other hand, can touch the smooth axis 10. It is noted that the spring radial centering tabs 21 can be made in the same piece of material as the synchronizing pinion 8.

Figure 16:
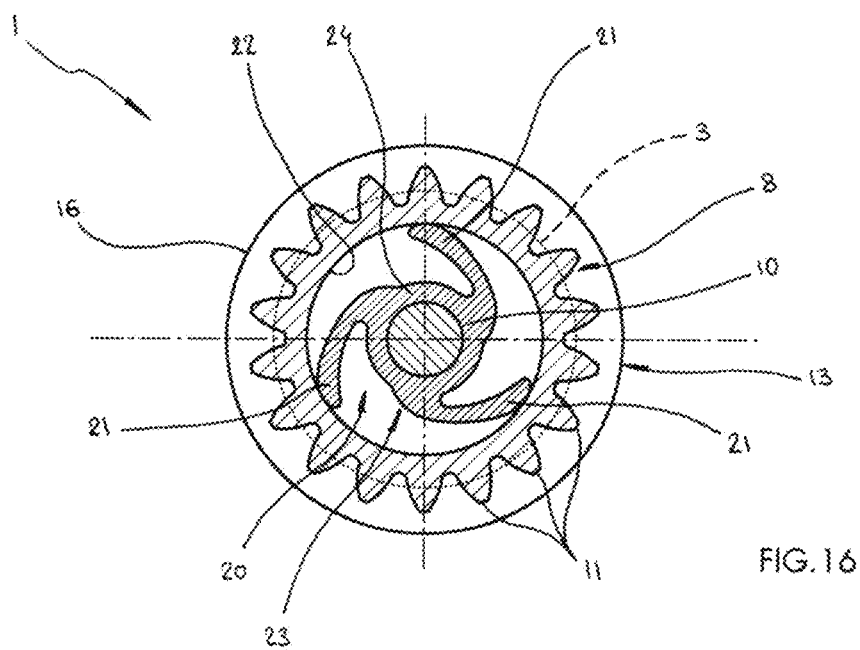
FIG. 16 is a schematic sectional view of the synchronizing pinion and the smooth axis of the synchronized roller with freewheels according to the invention, in a variant in which spring radial centering means are interposed radially between said axis and said pinion which take the form of a tab washer which has in its center a rotating sleeve which can rotate about said axis, and whose outer cylindrical face is bristled with three spring radial centering tabs which can press on the inner surface of a central recess included in the synchronizing pinion.

As a variant shown in FIG. 16, it will be noted that the spring radial centering means 20 may consist of at least one tab washer 23 which has a rotating sleeve 24 at its center which can turn around the smooth axis 10, and whose outer cylindrical face is bristling with at least three spring radial centering tabs 21 which can press on the inner surface of a central recess 22 included in the synchronizing pinion 8.

Figure 17:
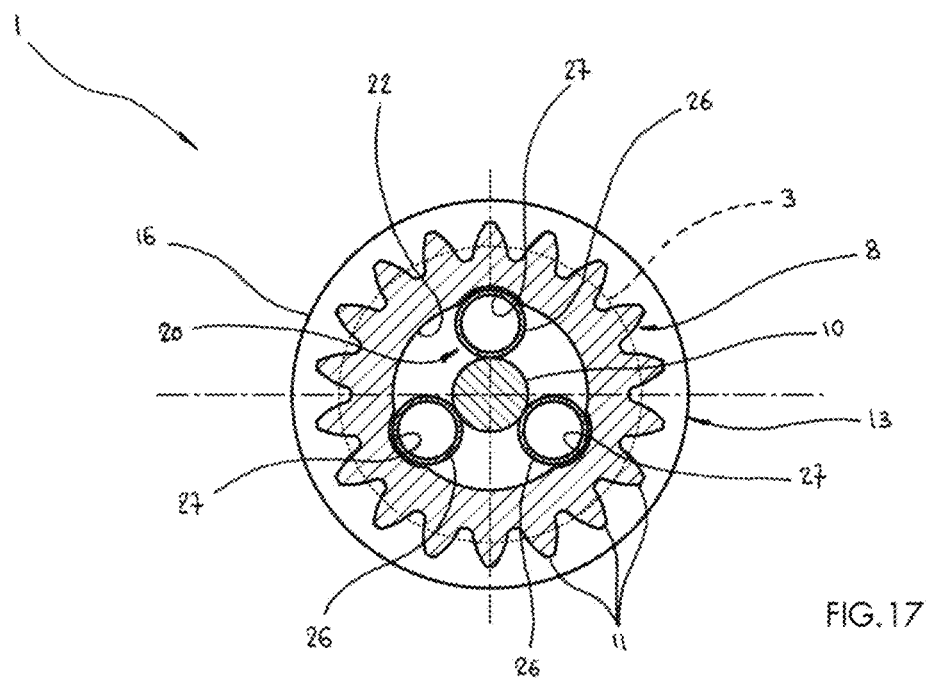
FIG. 17 is a schematic sectional view of the synchronizing pinion and the smooth axis of the synchronized roller with freewheels according to the invention, in a variant according to which spring radial centering means are interposed radially between said axis and said pinion which take the form of three deformable rings, each placed in a disk housing arranged on the inner surface of a central recess included in the synchronizing pinion, said rings being able to touch the smooth axis.

Another variant shown in FIG. 17 provides that the spring radial centering means 20 may consist of at least three deformable rings 26 which, on the one hand, are placed in a ring housing 27 arranged on the inner surface of a central recess 22 included in the synchronizing pinion 8 and, on the other hand, can touch the smooth axis 10. It should be noted that the deformable rings 26 can be mounted more or less tight between the ring housing 27 in which they are placed, on the one hand, and the smooth axis 10 on the other hand.

Figure 18:
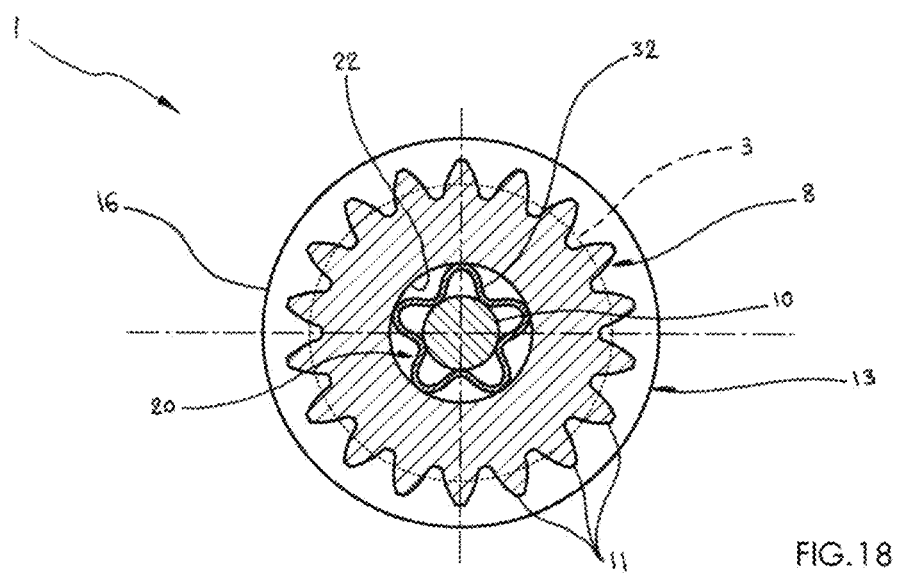
FIG. 18 is a schematic sectional view of the synchronizing pinion and the smooth axis of the synchronized roller with freewheels according to the invention, in a variant according to which spring radial centering means are interposed radially between said axis and said pinion which take the form of a spring washer with radial corrugations housed between the inner cylindrical face of a central recess included in the synchronizing pinion, on the one hand, and the smooth axis, on the other hand.

The variant shown in FIG. 18 provides that the spring radial centering means 20 may consist of at least one spring washer with radial corrugations 32 housed between, on the one hand, the inner cylindrical face of a central recess 22 included in the synchronizing pinion 8 and, on the other hand, the smooth axis 10, the central recess 22 possibly having a shape complementary to that of the spring washer with radial corrugations 32.

In FIG. 14, it will be noted that the spring radial centering means 20 may also consist of at least one compressible ring 28 made of flexible material, said ring 28 being radially interposed between, on the one hand, the internal surface of a central recess 22 included in the synchronizing pinion 8 and, on the other hand, a flexible ring support disk 29 which can rotate around the smooth axis 10.

It will be noted that said flexible material may be an elastomer such as rubber, silicone, or any other compressible material having the desired elasticity and strength.

It will also be noted that said flexible material can be overmolded directly on the synchronizing pinion 8 and on the flexible ring support disk 29 to form a single part with these components 8, 29.

Figure 19:
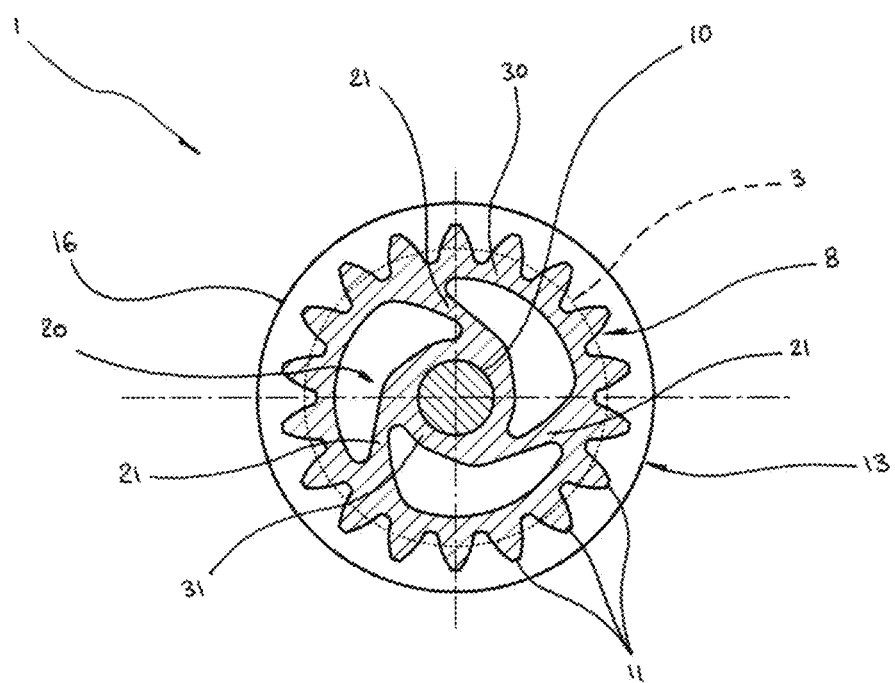
FIG. 19 is a schematic sectional view of the synchronizing pinion and the smooth axis of the synchronized roller with freewheels according to the invention, in a variant according to which the synchronizing pinion comprises spring radial centering means which consist of three spring radial centering tabs whose first end is integral with a pinion rim located at the periphery of the synchronizing pinion, and whose second end is integral with a pinion hub located at the center of the synchronizing pinion, said pinion hub being articulated around the smooth axis.

FIG. 19 shows this time that it is the synchronizing pinion 8 itself which can have spring radial centering means 20 which tend to always recenter said pinion 8 on the smooth axis 10 and which consist of at least one spring radial centering tab 21 whose first end is integral with a pinion rim 30 which is located at the periphery of the pinion synchronizing 8 and whose second end is integral with a pinion hub 31 which is located at the center of the synchronizing pinion 8, said hub 31 being articulated around the smooth axis 10.

It will be noted that according to this particular configuration of the synchronized roller with freewheels 1 according to the invention, the spring radial centering tab 21 can adopt any geometry, without limitation. However, the spring radial centering tab 21 is preferably of small thickness and oriented tangentially to the smooth axis 10 so as to provide a sufficient reserve of elasticity to allow the pinion rim 30 to be offset with respect to the pinion hub 31, under the desired conditions.

Finally, and as shown more particularly in FIGS. 1 to 4, the synchronizing pinion 8 may have spring radial centering means 20 which tend to always recenter said pinion 8 on the smooth axis 10 and which consist of a thin web 33 forming at least one web cone 34, the first end of said web 33 being integral with a pinion rim 30 which is located at the periphery of the synchronizing pinion 8, while the second end of said web 33 is integral with a pinion hub 31 which is located at the center of the synchronizing pinion 8, said hub 31 being articulated around the smooth axis 10.

It should be noted that according to this particular configuration of the synchronized roller with freewheels 1 according to the invention, the thin web 33 can be substituted for a spring axial guide washer 19 for pressing, on the one hand, and by means of the pinion rim 30, a rigid axial guide washer 16 against an axial bearing face 17 exposed by the central body 2 between the smooth axis 10 and the outer cylindrical rolling surface 3 and, on the other hand, the pinion hub 31 against the pinion axial stop means 12.

It is also noted that advantageously, the thin web 33 can be perforated to reduce its rigidity.

Finally, FIG. 14 illustrates that at least one of the ends 9 of the central body 2 may advantageously have an axial bearing face 17 located between the smooth axis 10 and the outer cylindrical rolling surface 3, said face 17 being hollowed out with an anti-edge effect recess 39.

It should be noted that the anti-edge effect recess 39 in question may have, for example, a tronco-toroidal shape, or be circular in a "U" section, "V" section, or in any section whatsoever, or be of any hollow form whatsoever that it is arranged in the axial bearing face 17.

Thus, when the synchronized roller with freewheels 1 supports a high load, the anti-edge effect recess 39 limits the stress applied to the constituent material of the central body 2 at the axial edges of the outer cylindrical rolling surface 3, said stress being known to those skilled in the art under the name of "edge effect".

In order to limit said stress, the anti-edge effect recess 39 provided as an alternative to the synchronized roller with freewheels 1 according to the invention advantageously replaces a convex profile provided on the outer cylindrical rolling surface 3 or on the rolling tracks 4 with which it cooperates.

With respect to said convex profile, the anti-edge effect recess 39 offers the advantage of producing a more homogeneous distribution of the contact pressure over the entire length of the outer cylindrical rolling surface 3.

The absence of convex profile also allows simplifying the manufacture of the synchronized roller with freewheels 1 according to the invention, the outer cylindrical rolling surface 3 then remaining perfectly cylindrical and not barrel-shaped.

Modus Operandi of the Invention

The modus operandi of the synchronized roller with freewheels 1 according to the invention is easily understood in the light of FIGS. 1 to 19.

To describe said modus operandi in detail, we will retain here the embodiment of the synchronized roller with freewheels 1 according to the invention as illustrated in FIGS. 1 to 4, said roller 1 being identical in FIGS. 5 to 12, although less visible. In addition, we will assume that said synchronized roller 1 is part of a synchronized roller bearing 35 such as that illustrated in FIGS. 5 and 6. It may be noted that said bearing 35 is similar to those found in the patent relating to a hydraulic motor-pump with fixed or variable displacement and published under No. FR 3 001 774, said patent belonging to the applicant.

Figure 3:
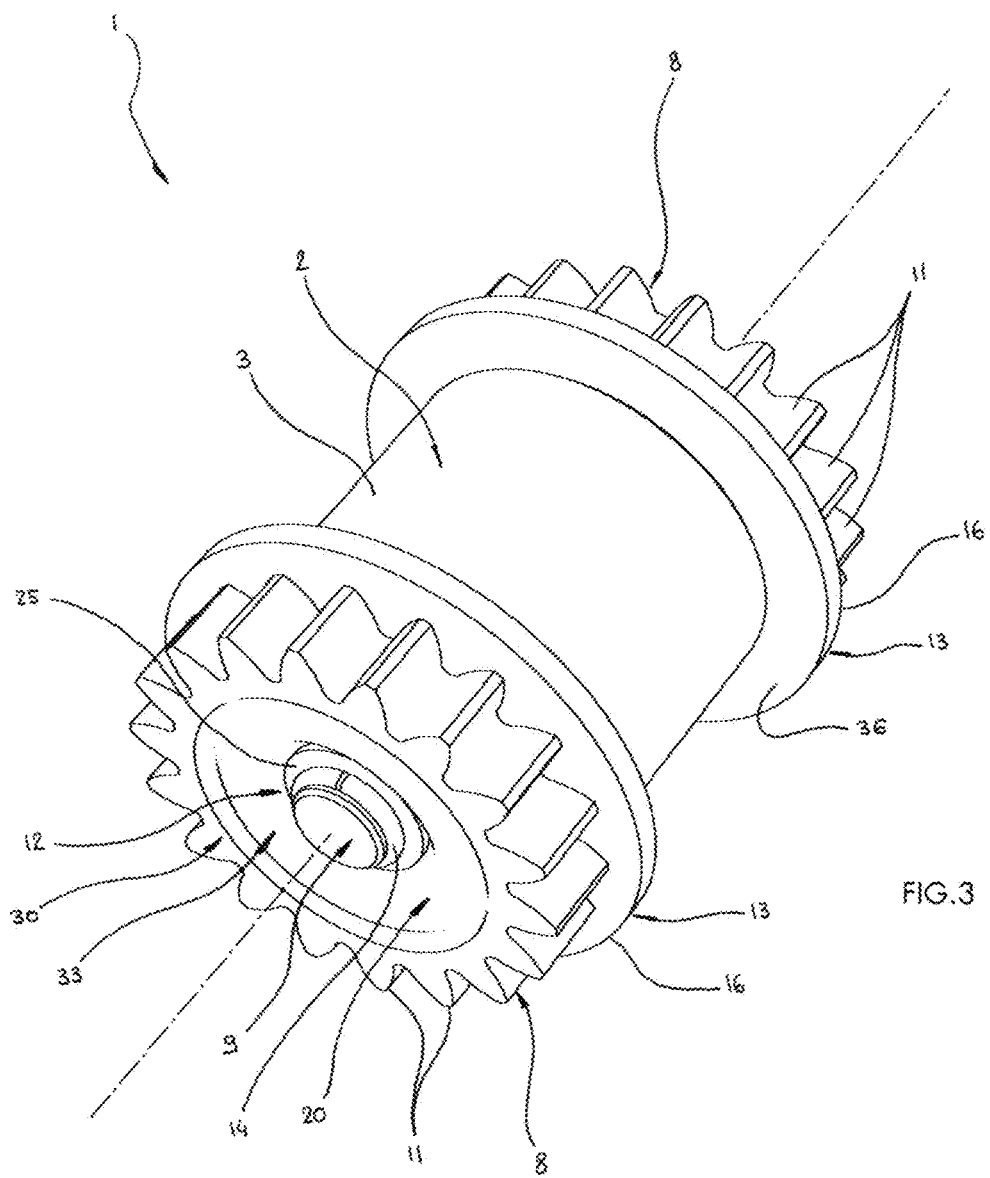
FIG. 3 is a three-dimensional view of the synchronized roller with freewheels according to the invention and according to its variant shown in FIGS. 1 and 2.
Figure 4:
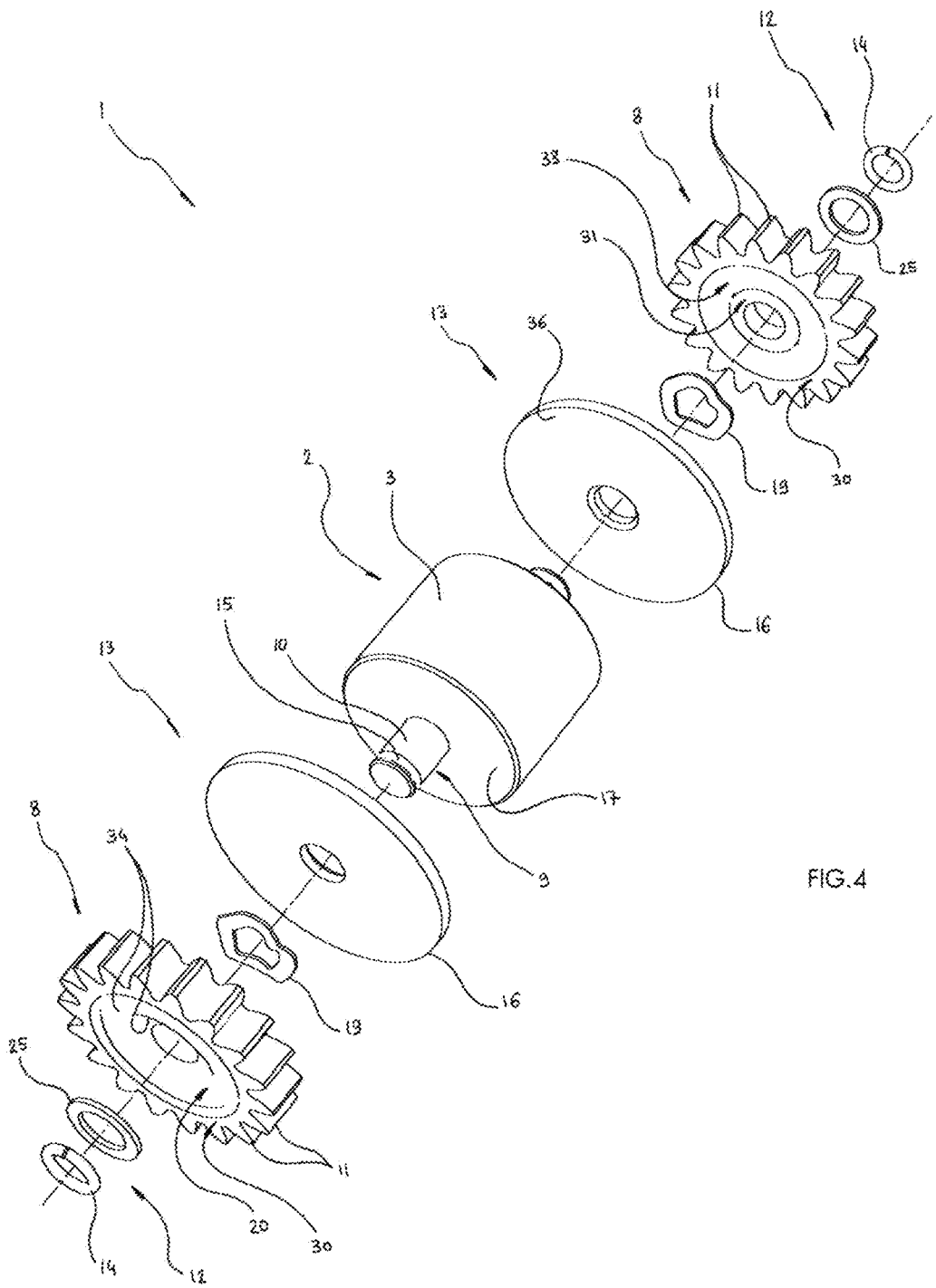
FIG. 4 is an exploded three-dimensional view of the synchronized roller with freewheels according to the invention and according to its variant shown in FIGS. 1 and 2.

As shown in FIGS. 2 to 4, the synchronized roller with freewheels 1 comprises a central body 2 which exposes an outer cylindrical rolling surface 3, which is interposed between two rolling tracks 4 as shown in FIG. 5 and FIGS. 7 to 11, on which said surface 3 rolls simultaneously when said tracks 4 move relative to each other. Each said track 4 is integrally lined with synchronizing means consisting of synchronizing rings 6 which form a gear system 7 with a synchronizing pinion 8 presented by each end 9 of the central body 2.

For a better understanding of the modus operandi of the synchronized roller with freewheels 1 according to the invention, the other synchronized rollers with freewheels 1 forming part of said bearing 35 are not represented in FIGS. 7 to 10, just as only one portion of the synchronizing rings 6 constituting said bearing 35 is represented, said portion being sufficient to illustrate said modus operandi.

It can be seen in FIGS. 1 to 4 that the pinion axial stop means 12 consist of an axial stop spring ring 14 housed in a spring ring groove 15 which is arranged on the smooth axis 10 around which the synchronizing pinion 8 can rotate freely, while an axial stop washer 25 is interposed axially between said ring 14 and said pinion 8.

It can also be seen in FIGS. 1 to 4, shown here as an exemplary embodiment of the synchronized roller with freewheels 1 according to the invention, that the roller axial guide means 13 consist of a rigid axial guide washer 16 which is axially interposed between the synchronizing pinion 8 and the axial bearing face 17 exposed by the central body 2 between its smooth axis 10 and its outer cylindrical rolling surface 3.

Still according to this embodiment, it is noted in FIGS. 2 and 4 that a spring axial guide washer 19 is provided and is interposed between the rigid axial guide washer 16 and the synchronizing pinion 8. Said spring washer 19 tends to press, on the one hand, the rigid axial guide washer 16 against the axial bearing face 17 and, on the other hand, the synchronizing pinion 8 against the axial pinion stop means 12.

Figure 11:
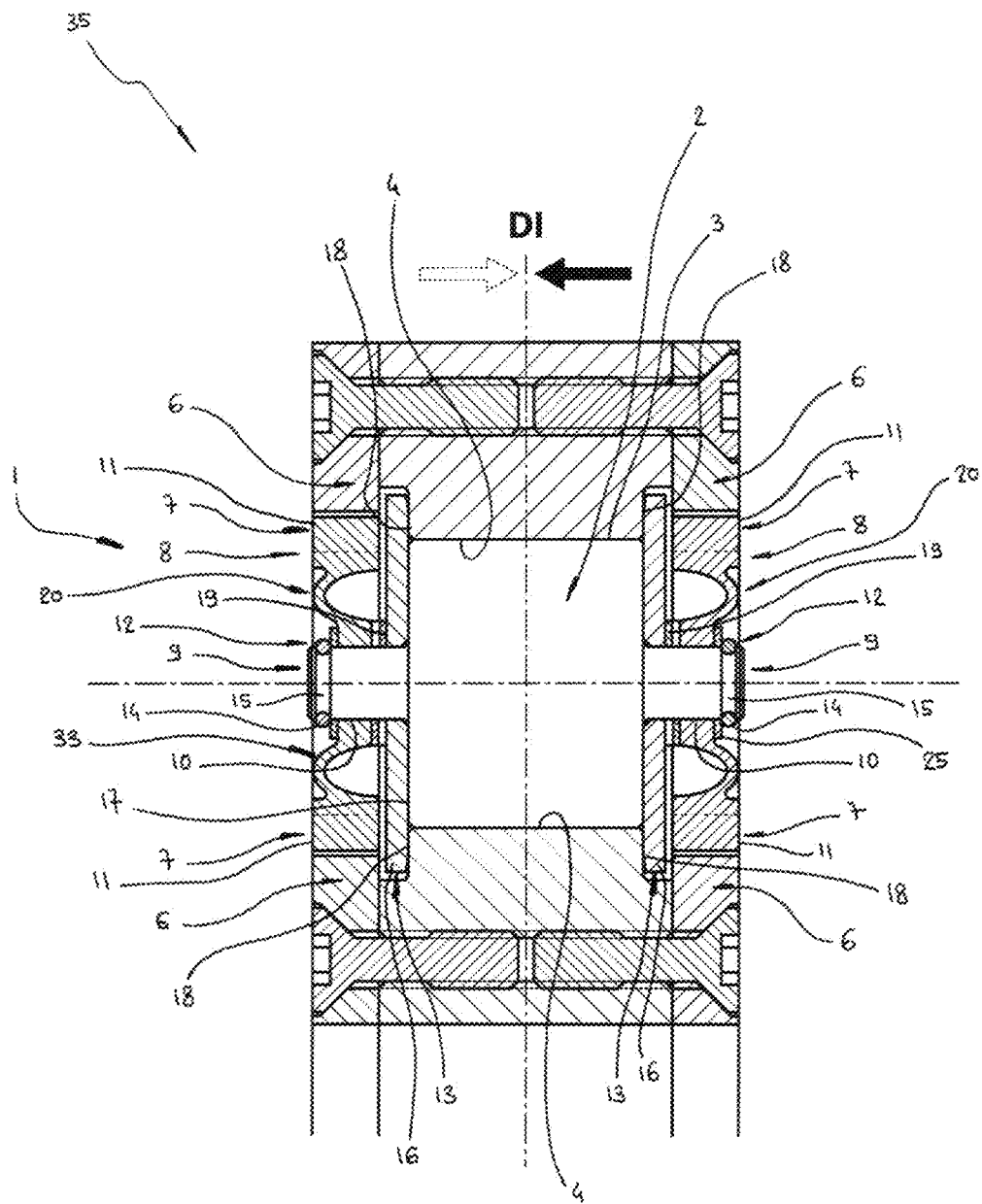
FIGS. 11 and 12 are schematic sectional views of the synchronized roller with freewheels according to the invention and according to its variant shown in FIGS. 1 and 2, said views being intended to illustrate—in the context of the synchronized roller bearing shown in FIGS. 5 and 6—the faculty of said roller to accommodate any misalignment of its rolling outer cylindrical surface with respect to the rolling tracks with which it cooperates, in particular by means of the rigid axial guide washer and the spring axial guide washer comprised in said roller.
Figure 12:
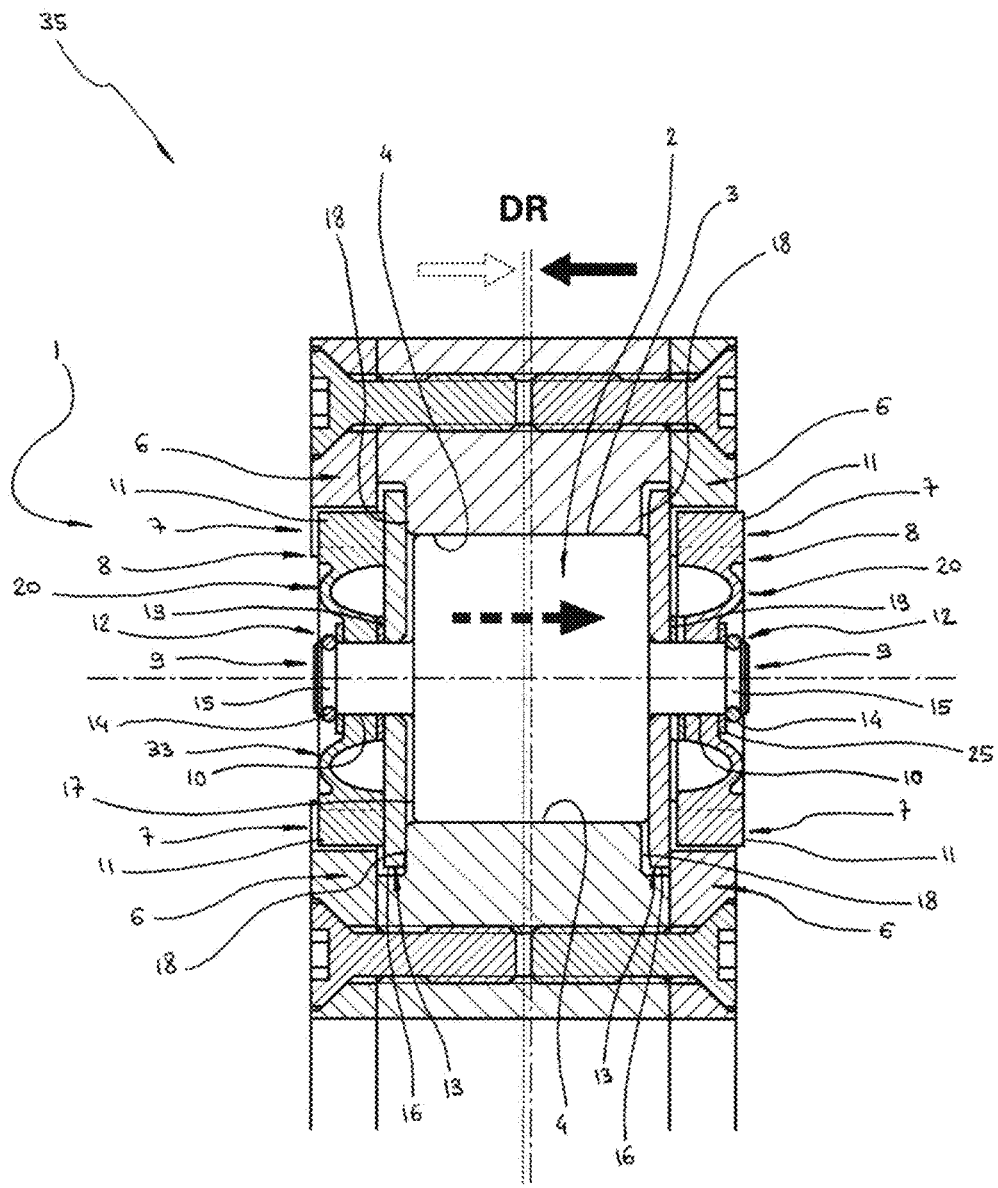

It can be seen particularly clearly in FIGS. 11 and 12 that the rigid axial guide washer 16 is provided to bear, if necessary, on the axial guide track 18 that is axially exposed by each of the rolling tracks 4. It should be noted that the rigid axial guide washer 16 exposes—at the contact zone between said washer 16 and said track 18—a rake edge which prevents the constituent material of said washer 16 from cutting the constituent material of said track 18.

To illustrate the modus operandi of the synchronized roller with freewheels 1 according to the invention, we will therefore take the variant shown in FIGS. 1 to 4 according to which spring radial centering means 20 are interposed radially between the smooth axis 10 and the synchronizing pinion 8. Said means 20 tend to always recenter said pinion 8 on said axis 10, and take here the form of a thin web 33 forming two web cones 34.

As can be clearly seen in FIG. 2, the first end of said web 33 is integral with a pinion rim 30 located at the periphery of the synchronizing pinion 8, while the second end of said web 33 is integral with a pinion hub 31 located at the center of the synchronizing pinion 8, said hub 31 being articulated around the smooth axis 10.

We will detail here what happens when the synchronized roller with freewheels 1 according to the invention is loaded which—in a synchronized roller bearing 35 similar to those found in the patent No. FR 3 001 774—only occurs on approximately one half-revolution As a precaution, there should be sufficient clearance between the teeth 11 of the synchronizing pinion 8 and that of the synchronizing rings 6. Given that the direction of rotation of the synchronized roller bearing 35 is not alternative but continuous, said clearance cannot be translated by any acoustic emission whatsoever.

When on approximately one revolution of the synchronized roller bearing 35 the synchronized roller with freewheels 1 is loaded, the latter is subjected to a high radial compression. As a result, said roller 1 is substantially crushed to the point where its outer cylindrical rolling surface 3 is deformed, is no longer exactly circular, and has two flats. Said radial compression induces to some extent a tangential compression of the constituent material of the outer cylindrical rolling surface 3, which leads to a substantial change in the circumference of said surface 3.

In addition, there is an inevitable difference between the initial diameter of the outer cylindrical rolling surface 3 and that of the pitch circle of the synchronizing pinion 8 comprised at each end 9 of the central body 2 of the synchronized roller with freewheels 1. This is because the accuracy of manufacture of said surface 3 and said pinion 8 is not infinite.

Whether it is the radial compression to which the outer cylindrical rolling surface 3 is subjected, or the difference between the initial diameter of said surface 3 and that of the pitch circle of the synchronizing pinions 8, these two factors lead—particularly when the synchronized roller with freewheels 1 moves under load relative to the rolling tracks 4 with which it cooperates—to a difference in angular speed between that of the outer cylindrical rolling surface 3 and that of the synchronizing pinions 8. It should be noted that said angular speed here applies to the rotation of said surface 3 and said pinions 8 around the axis of the synchronized roller with freewheels 1 to which they belong.

If the synchronizing pinions 8 were rigidly secured to the central body 2, said difference in angular speed would inevitably lead to an overload of the teeth 11 of the synchronizing pinion 8 and that of the synchronizing rings 6.

As the synchronized roller with freewheels 1 according to the invention provides that the synchronization pinions 8 can freely rotate around the smooth axis 10 with which they cooperate, said difference in angular speed does not have the effect of overloading the teeth 11, and the outer cylindrical rolling surface 3 can freely offset angularly with respect to the synchronizing pinions 8.

Figure 7:
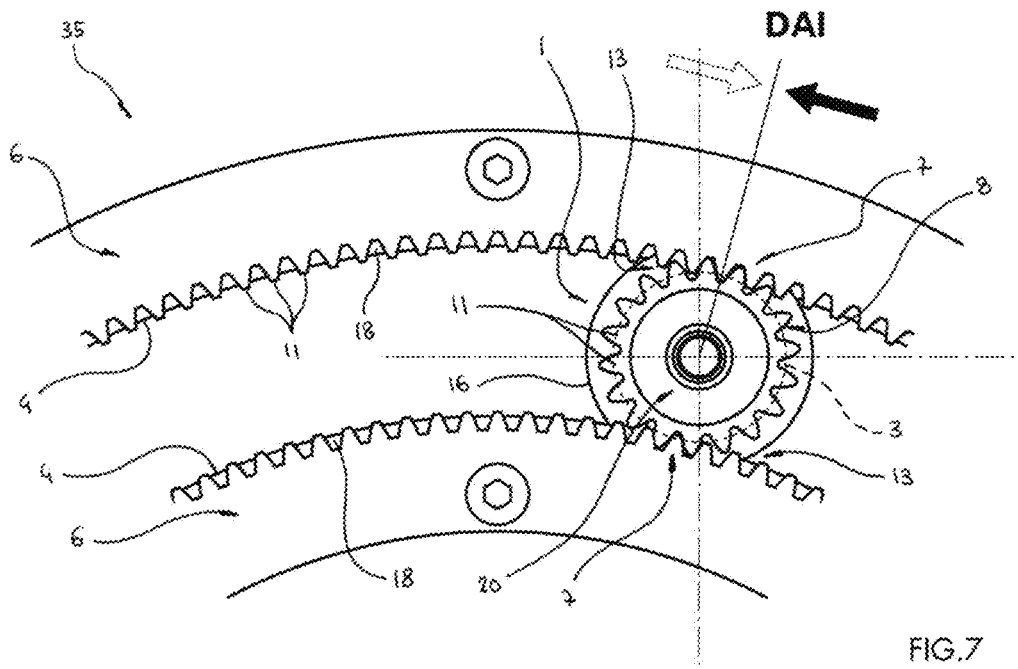
FIGS. 7 and 8 are side views of the synchronized roller with freewheels according to the invention and according to its variant shown in FIGS. 1 and 2, said views being intended to illustrate—in the context of the synchronized roller bearing shown in FIGS. 5 and 6—the faculty of said roller to accommodate any difference between, on the one hand, the angular velocity of its rolling outer cylindrical surface along its own axis, and, on the other hand, the angular velocity as well of its synchronizing pinions along their own axis; said difference leading to a rolling angular difference between said surface and said pinions.
Figure 8:
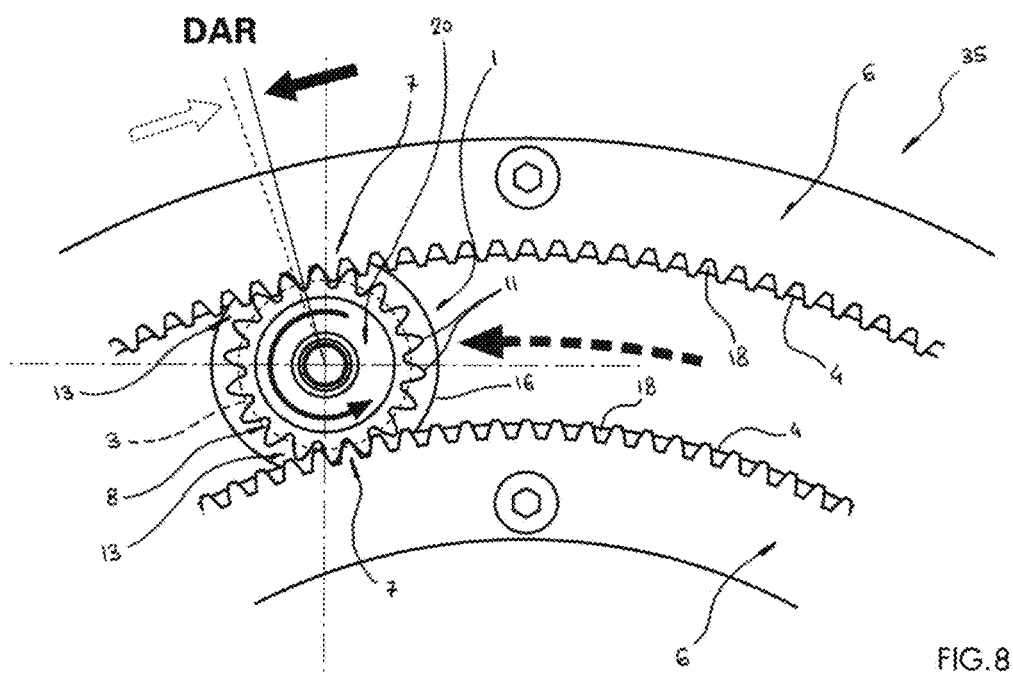

This offset is illustrated in FIGS. 7 and 8. FIG. 7 shows a nil initial angular offset DAI which, after a certain distance traveled by the synchronized roller with freewheels 1, becomes a non-nil angular rolling offset DAR as shown in FIG. 8. For a better understanding, said DAR offset is voluntarily visually exaggerated.

It will be noted that the angular offset DAR occurs without impairing the proper maintenance of the alignment and orientation of the synchronized roller with freewheels 1 with respect to the rolling tracks 4 with which it cooperates.

Indeed, the angular positions relating to the synchronized roller bearing 35 of the synchronizing pinions 8 of the same synchronized roller with freewheels 1 are invariably identical insofar as the two synchronizing rings 6 of the same rolling track 4 are indexed in rotation in the same way. Said angular positions are therefore imposed by the gear system 7.

Furthermore, it is noted that if the outer cylindrical rolling surface 3 rolled without sliding on the rolling tracks 4 with which it cooperates, its angular position relative to the synchronized roller bearing 35 would remain invariably identical to that of the two synchronizing pinions 8 connected to the same central body 2, regardless of the diameter of said surface 3.

At this stage of the explanation of the modus operandi of the synchronized roller with freewheels 1 according to the invention, it is therefore clear that the only disturbance that could now overload the teeth 11 constituting the gear system 7 would no longer come from a difference between the angular speed of the outer cylindrical rolling surface 3 and that of the synchronizing pinions 8 along their own axis leading to an angular offset DAR as shown in FIG. 8, but from a difference between, on the one hand, the angular speed of said surface 3 relative to the synchronized roller bearing 35 and, on the other hand, the angular speed of the synchronizing pinions 8 with respect to said bearing 35.

This second difference can only come from manufacturing defects of the teeth 11 constituting the gear system 7. These defects necessarily exist because the accuracy of said manufacture is not infinite.

It should be noted that said defects disturb the rotation of the synchronizing pinions 8 with respect to the synchronized roller bearing 35. Consequently, said rotation can alternatively change from slightly ahead to slightly late compared with the ideal rotation of the synchronizing pinions 8 having a perfect involute profile of a circle.

In practice, said slight advance or said slight delay may be worth only a few microns. However, on the small teeth 11, said microns can represent high or even excessive load levels, which can lead to premature wear or even breakage of said teeth 11. In addition, any abnormal overload of teeth 11 produces friction which is detrimental to the overall energy balance of the mechanism or apparatus in which the synchronized roller bearing 35 is implemented.

It is to prevent and to solve this problem that according to the variant embodiment of the synchronized roller with freewheels 1 of the invention, considered here to illustrate how it works, the synchronizing pinion 8 included at that each end 9 of the central body 2 of said roller 1 comprises spring radial centering means 20 which tend to always recenter said pinion 8 on the smooth axis 10 with which it cooperates. Said means 20 consist in this case of a thin web 33 forming two web cones 34.

The rigidity of the two web cones 34 was intended to be significantly lower than that of the teeth 11, but high enough to ensure firmly maintaining the alignment of the central body 2 with respect to the rolling tracks 4.

Figure 9:
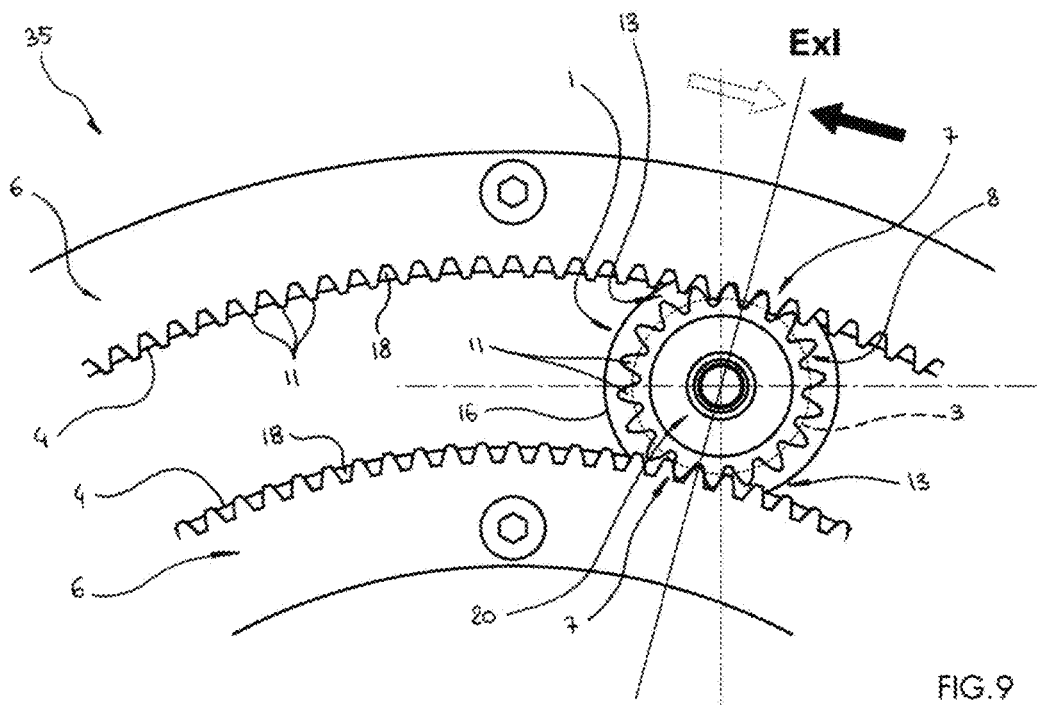
FIGS. 9 and 10 are side views of the synchronized roller with freewheels according to the invention and according to its variant shown in FIGS. 1 and 2, said views being intended to illustrate—in the context of the synchronized roller bearing shown in FIGS. 5 and 6—the faculty of said roller to accommodate any difference between, on the one hand, the angular velocity of the rolling outer cylindrical surface with respect to the bearing axis, and, on the other hand, the angular velocity of the synchronizing pinions still with respect to said bearing axis, said difference leading to a rolling eccentricity between said surface and said pinions.
Figure 10:
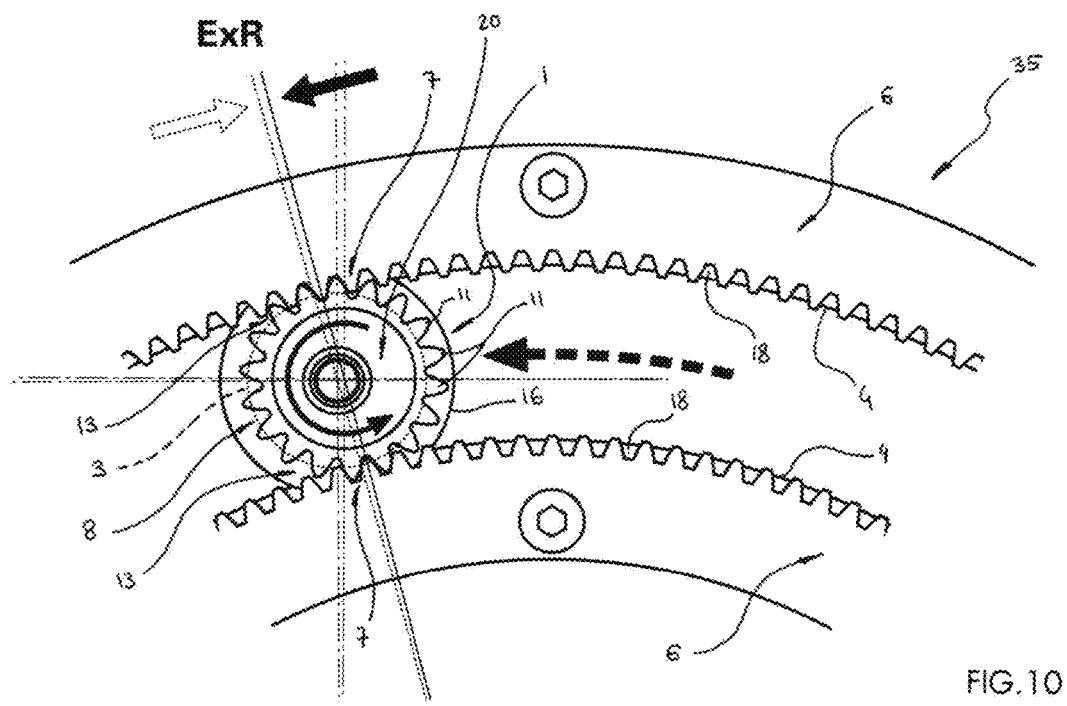

The sequencing of the operation of the spring radial centering means 20 is particularly illustrated by FIGS. 9 and 10. FIG. 9 shows a nil initial EXI offset which becomes, after a certain distance traveled by the synchronized roller with freewheels 1, a non-nil rolling offset ExR as shown in FIG. 10. For a better understanding, said offset ExR is voluntarily visually exaggerated.

It is thus understood that, when a difference occurs momentarily between the angular speed of the outer cylindrical rolling surface 3 with respect to the axis of the synchronized roller bearing 35 and the angular speed of the synchronizing pinions 8 with respect to the axis of said bearing 35, the pinion rim 30 located at the periphery of the synchronizing pinion 8 is substantially offset relative to the pinion hub 31 located at the center of said pinion 8, which produces the rolling offset ExR.

This ExR offset protects the teeth 11 from excessive overload, said teeth 11 not being subjected—consecutively to said offset—to a slight variation of load.

It should be noted that once the outer cylindrical rolling surface 3 is relieved of any radial compression, which occurs when the synchronized roller with freewheels 1 is located in the non-loaded angular sector of the synchronized roller bearing 35, the spring radial centering means 20 can recenter the pinion rim 30 on the pinion hub 31 so as to restore a nil initial offset EXI as shown in FIG. 9, before said surface 3 is subjected to a new load cycle.

It should be noted—particularly in FIGS. 1 to 4—the roller axial guide means 13 which consist of a rigid axial guide washer 16 axially interposed between the synchronizing pinion 8 and the axial bearing face 17 exposed by the central body 2 between its smooth axis 10 and its outer cylindrical rolling surface 3.

It should also be noted in FIGS. 2 and 4 the axial guide spring washer 19 which is interposed between the rigid axial guide washer 16 and the synchronizing pinion 8.

If, when under load, the outer cylindrical rolling surface 3 tends to be misaligned with any one of the rolling tracks 4 with which it cooperates, the rigid axial guide washer 16 and the spring axial guide washer 19 are provided to cooperate in keeping said surface 3 aligned with said tracks 4, or at least to realign said surface 3 with said tracks 4 between two charging cycles of said surface 3.

The cooperative operation of said rigid washer 16 and said spring washer 19 is particularly illustrated in FIGS. 11 and 12.

FIG. 11 shows the axial position centered on the rolling tracks 4 which is sought for the outer cylindrical rolling surface 3. The initial misalignment DI of said surface 3 with respect to said tracks 4 is therefore nil.

When the outer cylindrical rolling surface 3 is under load and if it tends to be misaligned with the rolling tracks 4, in a first step, the corresponding rigid axial guide washer 16 lets said surface 3 be misaligned by detaching from the face of the axial support 17 on which it is pressed, and by compressing the spring axial guide washer 19.

This results in a non-nil rolling misalignment DR of the outer cylindrical rolling surface 3 with respect to the rolling tracks 4 with which it cooperates, as shown in FIG. 12. For a better understanding, said misalignment DR is voluntarily visually exaggerated.

In a second step, and as soon as the radial load exerted on the outer cylindrical rolling surface 3 diminishes or even disappears, the spring axial guide washer 19 can bring with minimal effort said surface 3 to a centered position with respect to the rolling tracks 4 through the rigid axial guide washer 16. This results in a return to the nil initial misalignment DI of the outer cylindrical rolling surface 3 relative to the rolling tracks 4 with which it cooperates, as shown in FIG. 11.

It is easily understood that the cooperation between the rigid axial guide washer 16 and the spring axial guide washer 19 limits the pressure exerted by the rigid axial guide washer 16 on the axial guide track 18 axially exposed by the rolling track 4 with which said washer 16 cooperates.

Indeed, in the absence of a spring axial guide washer 19, the rigid axial guide washer 16 should be permanently recentering the outer cylindrical rolling surface 3, including when the latter is subjected to high loads.

Moreover, the rigid axial guide washer 16 can hardly take up high axial forces because it cooperates with the axial guide tracks 18 via a small contact surface, said contact being necessarily largely slippery.

As a result of what has just been said, the synchronized roller bearing 35 of which the synchronized roller with freewheels 1 is part according to this example is also not designed to take up significantly high axial efforts, which must instead be taken over, for example, by means of a ball or roller axial stopper known per se which cooperates with the synchronized roller bearing 35.

It will be noted that, in addition to the great durability and high energy efficiency which the synchronized roller with freewheels 1 according to the invention achieves thanks to the particular modus operandi which has just been described, said synchronized roller with freewheels allows in particular to produce various devices, among which synchronized roller bearings 35 with very high energy efficiency, highly charged, and able to rotate at high speed despite their large diameter.

It will be noted that the synchronized roller with freewheels 1 according to the invention is also intended to offer a manufacturing cost as low as possible.

Indeed, synchronizing pinions 8 of said roller 1 can be manufactured separately and at lower cost by sintering or cold stamping, without requiring high geometric precision or expensive profile corrections since the load applied to the teeth 11 constituting said pinions 8 is low.

The low load applied to the synchronizing pinions 8 also allows avoiding to resort to any expensive surface treatment or heat treatment for their manufacture.

The manufacture of simpler parts such as the rigid axial guide washer 16 or the spring axial guide washer 19 does not present any difficulty and is notoriously cheap.

The manufacture of the central body 2 of the synchronized roller with freewheels 1 according to the invention also remains simple, in particular in that the realization of the smooth axis 10 does not call for high precision. Furthermore, the finish of the outer cylindrical rolling surface 3 can be achieved by a grinding method known as "centerless", which is notoriously precise, inexpensive, and guarantees excellent repeatability.

It will also be noted that in order to reduce the edge effect, a transverse convex profile can advantageously be provided to the rolling tracks 4 rather than to the outer cylindrical rolling surface 3.

The synchronization rings 6 may be provided attached by screwing to the mechanical parts which receive the synchronized roller bearing 35 while the rolling tracks 4 with which they cooperate are either directly made in said mechanical parts, or added in the latter.

The possibilities of the synchronized roller with freewheels 1 according to the invention are not limited to the applications just described and it must also be understood that the foregoing description was given by way of example only and that it does not limit the scope of said invention in any way, and that any other equivalent variations of the execution details described herein may be adopted without departing from said scope.

The invention claimed is:

1. A synchronized roller with freewheels comprising a central body which exposes an outer cylindrical rolling surface provided interposed between two rolling tracks on which it rolls simultaneously when said tracks move relative to each other, each said track being integrally lined with synchronization means which form a gear system with a synchronizing pinion located at each end of the central body, the synchronized roller comprising:
   a smooth axis of smaller diameter than that of the cylindrical rolling surface, arranged at each end of the central body, and around which the synchronizing pinion can rotate freely;
   pinion axial stop means integral with the smooth axis which bear directly or indirectly on said axis and bear directly or indirectly on the synchronizing pinion to prevent said pinion from emerging from said axis;
   roller axial guide means which bear directly or indirectly on the central body and directly or indirectly on at least one of the rolling tracks with which the cylindrical rolling surface cooperates in order to keep the latter approximately centered on said tracks.

2. The synchronized roller with freewheels according to claim 1, wherein the pinion axial stop means consist of an axial stop spring ring housed in a spring ring groove arranged on the smooth axis.

3. The synchronized roller with freewheels according to claim 1, wherein the roller axial guide means consist of a rigid axial guide washer which is axially and directly or indirectly interposed between the synchronizing pinion and an axial bearing surface exposed by the central body between the smooth axis and the outer cylindrical rolling surface, said rigid washer being able to bear on an axial guide track axially exposed at least by one of the rolling tracks.

4. The synchronized roller with freewheels according to claim 3, wherein a spring axial guide washer is interposed between the rigid axial guide washer and the synchronizing pinion, said spring washer tending to press the rigid axial guide washer against the axial bearing face with which it cooperates and also to press the synchronizing pinion against the pinion axial stop means with which it cooperates.

5. The synchronized roller with freewheels according to claim 3, wherein a spring axial guide washer is interposed between the synchronizing pinion and the pinion axial stop means, said spring washer tending to press the synchronizing pinion against the rigid axial guide washer so that the latter is in turn pressed against the axial bearing face with which it cooperates.

6. The synchronized roller with freewheels according to claim 5, wherein the spring axial guide washer comprises at its center centering claws snapped into a claw groove arranged on the smooth axis, said groove constituting the pinion axial stop means.

7. The synchronized roller with freewheels according to claim 1, wherein spring radial centering means are interposed radially between the smooth axis and the synchronizing pinion, said spring radial centering means tending to always recenter said pinion on said axis.

8. The synchronized roller with freewheels according to claim 7, wherein the spring radial centering means consist of at least three spring radial centering tabs which emerge radially from the inner surface of a central recess included in the synchronizing pinion and which can touch the smooth axis.

9. The synchronized roller with freewheels according to claim 7, wherein the spring radial centering means consist of at least one tab washer which has at its center a rotating sleeve which can rotate around the smooth axis, and whose outer cylindrical face is bristling with at least three spring radial centering tabs that can press on the inner surface of a central recess included in the synchronizing pinion.

10. The synchronized roller with freewheels according to claim 7, wherein the spring radial centering means consist of at least three deformable rings which are placed in a ring housing arranged on the inner surface of a central recess included in the synchronizing pinion and which also can touch the smooth axis.

11. The synchronized roller with freewheels according to claim 7, wherein the spring radial centering means consist of at least one spring washer with radial corrugations housed between the inner cylindrical face of a central recess included in the synchronizing pinion and the smooth axis.

12. The synchronized roller with freewheels according to claim 7, wherein the spring radial centering means consist of at least one compressible ring made of flexible material, said ring being interposed radially between the inner surface of a central recess included in the synchronizing pinion and a flexible ring support disk that can rotate around the smooth axis.

13. The synchronized roller with freewheels according to claim 1, wherein the synchronizing pinion comprises spring radial centering means which tend to always recenter said pinion on the smooth axis and which consist of at least one spring radial centering tab whose first end is integral with a pinion rim located at the periphery of the synchronizing pinion and whose second end is integral with a pinion hub located at the center of the synchronizing pinion, said hub being articulated around the smooth axis.

14. The synchronized roller with freewheels according to claim 1, wherein the synchronizing pinion has spring radial centering means which tend to always recenter said pinion on the smooth axis and which consist of a thin web forming at least one web cone, the first end of said web being integral with a pinion rim located at the periphery of the synchronizing pinion while the second end is integral with a pinion hub located at the center of the synchronizing pinion, said hub being articulated around the smooth axis.

15. The synchronized roller with freewheels according to claim 1, wherein at least one of the ends of the central body comprises an anti-edge effect recess located between the smooth axis and the outer cylindrical rolling surface.

* * * * *